Aug. 18, 1936.          A. A. WELLS                2,051,662
                    POTTERY FINISHING LATHE
                   Filed Jan. 10, 1934       2 Sheets-Sheet 1
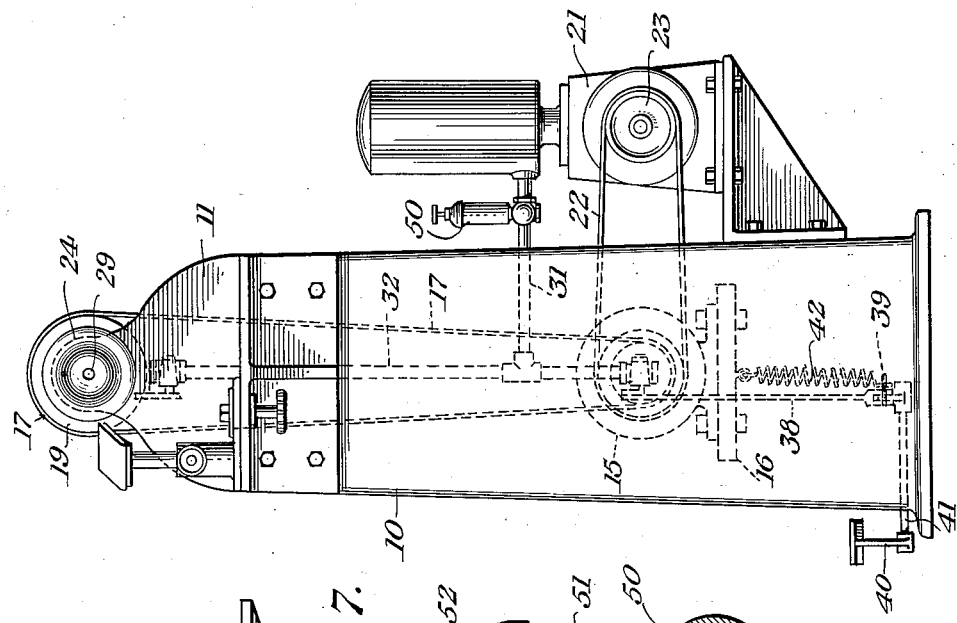
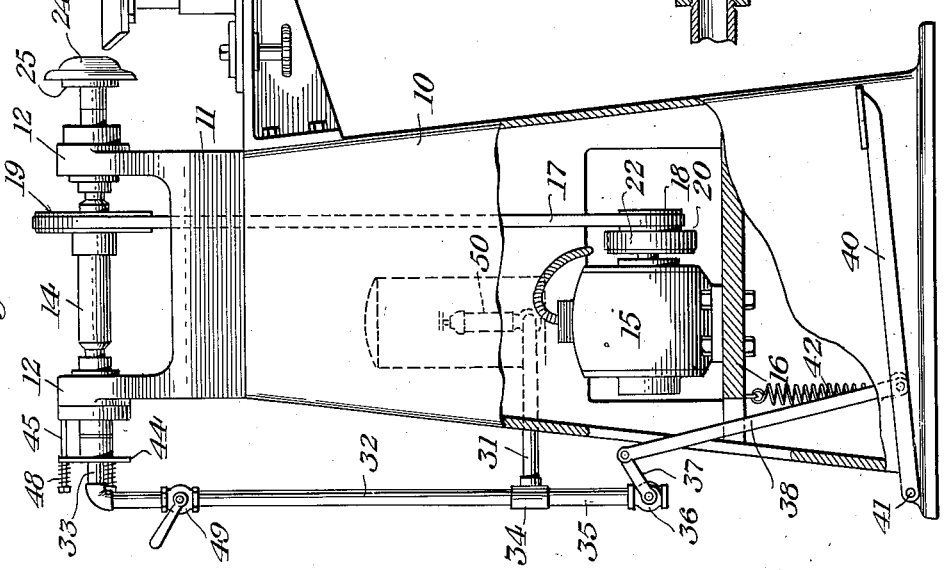
Arthur A. Wells
INVENTOR
BY Victor J. Evans & Co
ATTORNEYS Aug. 18, 1936.  A. A. WELLS  2,051,662
POTTERY FINISHING LATHE
Filed Jan. 10, 1934   2 Sheets-Sheet 2
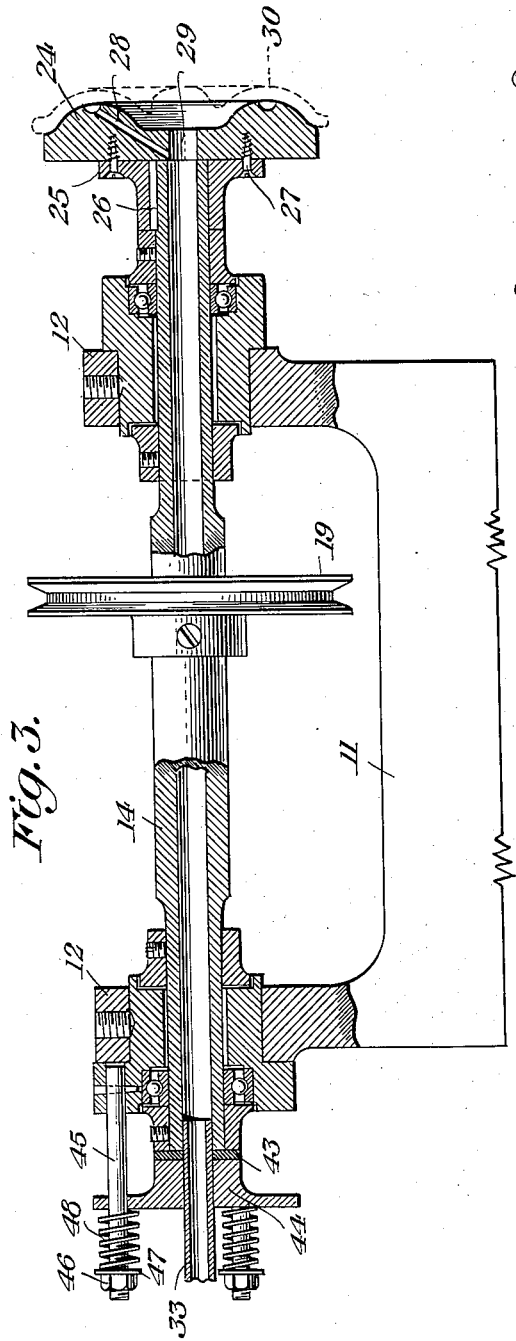
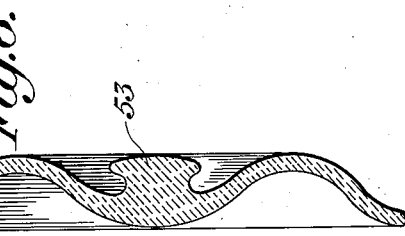
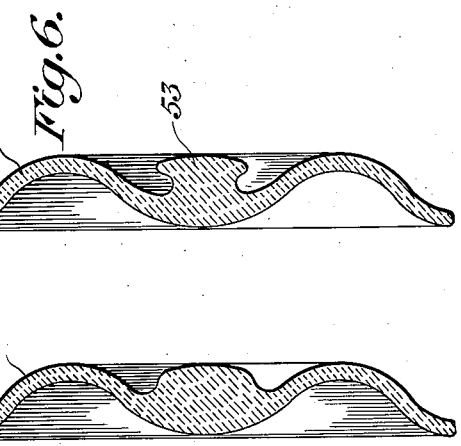
Arthur A. Wells
INVENTOR Patented Aug. 18, 1936

2,051,662

UNITED STATES PATENT OFFICE 2,051,662

POTTERY FINISHING LATHE

Arthur A. Wells, Newell, W. Va., assignor to The Homer Laughlin China Company, Newell, W. Va., a corporation of West Virginia Application January 10, 1934, Serial No. 706,144

1 Claim. (Cl. 25—24)

The object of the invention is to provide a pottery finishing lathe of a character to secure the pieces of pottery to be operated upon in position on the rotary member so as to be readily and easily rotated without the application of any other than an elastic fluid pressure to maintain them in place; to provide a tool of the kind indicated in which means is included to determine the time element in attaining the desired degree of vacuum behind the piece being operated upon in order that such piece may not be suddenly driven onto the element of the machine by which it is carried and thereby cause breakage of the piece; to provide a pottery finishing lathe having adjustable means to determine the degree of vacuum produced in the chuck or piece-carrying member thereof; to provide a lathe of the kind indicated having means for easily and quickly breaking the chuck vacuum to permit release of the retained piece; and generally to provide a tool of the character specified which is of simple form, susceptible of cheap manufacture, and of a character not subject, in usage, to disarrangement of its parts.

With this object in view, the invention consists in a construction and combination of parts of which a preferred embodiment is illustrated in the accompanying drawings, wherein:

Figure 1 is an elevational view, partly broken away, of the invention.

Figure 2 is an end elevational view looking at the chuck face.

Figure 3 is a central diametrical sectional view through the spindle and chuck.

Figure 4 is an elevational view looking at the rear face of the packing follower or gland.

Figure 5 is a diametrical sectional view of a piece of pottery as it will appear when ready for the operation to be performed on the invention.

Figure 6 is a view similar to Figure 5 and of the same piece after the finishing operation.

Figure 7 is a central vertical sectional view of the relief valve.

The invention is embodied in a lathe of conventional form having the hollow column 10, at the upper end of which the head 11 is mounted, the latter being provided with the spaced bearings 12 in which the spindle 14 is journalled. The spindle is driven through the instrumentality of a motor 15 housed in the column and supported on a shelf 16 in the latter and motion from the one to the other is communicated through a belt 17 traversing a sheave 18 on the motor and the sheave 19 mounted on the spindle. By reason of a pulley 20 which is also mounted on the motor, the air pump 21 is driven, a belt 22 being trained over the pulley 20 and over a pulley 23 on the shaft of the air pump.

The air pump is designed to maintain a partial vacuum in the spindle 14 which is of tubular form and which carries at its forward end a chuck 24 which is mounted on the face plate 25, the latter being secured to the forward end of the spindle in any acceptable manner, either as by a screw connection or as by a key 26, as shown. The chuck has its front face made to the conformation of the particular piece to be operated upon and is preferably of wood, being secured to the face plate, as by screws 27. The chuck is formed with air channels 28 opening on its face and extending into the center channel 29 which is in communication with the bore of the spindle. When a piece of pottery, such as the piece indicated at 30, is disposed on the chuck, it is retained in position thereon by the exterior air pressure, if the air be exhausted from the interior of the spindle which it is the function of the air pump to accomplish.

A tubular connection is effected between the intake of the air pump and that end of the spindle remote from the chuck, this tubular connection comprising coupled pipes 31, 32 and 33, the pipes 31 and 32 being joined by means of a T 34, a pipe 35 being connected in to the T at the opposite end of the cross-leg from that with which the pipe 32 connects. A valve 36 is mounted at the free end of the pipe 35 and has its plug equipped with an arm 37, to the free extremity of which is connected a link 38, the latter having a pivotal connection with the extremity of an arm 39 movable in common with a treadle 40 by reason of the two being mounted on the same rock shaft 41. The spring 42 tends normally to elevate the arm and thus the treadle, the upward push thus imparted to the arm 37 resulting in the valve 36 being moved to closed position. This is the normal position of the valve. When it is open, the pipe 32 is placed in communication with the atmosphere and thus any vacuum established in the interior of the spindle will be broken.

The pipe 33 enters that end of the spindle 14 remote from the chuck but through a packing washer 43, this washer being forced into the end of the rotating spindle and therefore into firm engagement with the end of the pipe through the instrumentality of a follower or gland 44 which is mounted on posts 45 extending rearwardly from the rear bearing and passing through the flange of the follower, receiving nuts 46 on their free extremities which bear against washers 47, the latter in turn bearing on compression springs 48 whose opposite ends bear on the rear face of the follower. The adjustment of the nuts determines the degree of pressure of the spring and thus the intensity with which the follower or gland bears against the packing 43. The packing 43 maintains an airtight connection between the stationary pipe 33 and the angularly movable spindle 14.

A manually adjustable valve 49 is interposed in the pipe 32 and is designed to be set so that there will be a time element involved in the establishment of the desired vacuum in the spindle 14 and in the chuck passages, after the attachment of the piece to be operated upon. Thus, in the operation of placing the piece on the chuck, it will not be quickly drawn out of the hand of the operator with the likelihood of fracture by impact with the chuck, as would be the case if the vacuum were quickly established.

A relief valve 50 is disposed in the pipe 31, this valve controlling communication between the pipe 31 and the atmosphere. The valve is spring seated as indicated at 51 and the pressure of the spring is adjustable by means of the manual member 52. The pressure with which the valve is held seated will determine the degree of vacuum that may be attained as, should there be any tendency of the pump to increase the degree of vacuum, the valve will open and admit air.

In the use of the invention, it is designed to operate upon pieces that have come from the jigger when they contain approximately 26% of moisture. After the moisture content has been reduced to approximately 15%—that is, when they are leather-hard, they are ready for the operation of the lathe. The valve 50 is adjusted so that the pump will maintain approximately ten inches of vacuum in the spindle and in the chuck passages, when the piece 30 is disposed on the chuck in covering relation to the passages. The piece will thus be securely retained on the chuck and may be operated upon to reduce the stock at the center to provide a knob or handle 53. When the piece is finished, removal becomes easy after the depression of the treadle 40, for by that operation the valve 36 is opened so that the vacuum is broken and the piece is released.

As above explained, the valve 49 is for slowing up the attaining of the vacuum in the attaching operation, so that the piece being mounted on the chuck may not be suddenly drawn from the hand of the user with the resultant hard impact on the chuck and the attendant likelihood of fracture or damage.

The invention having been described, what is claimed as new and useful is:

A pottery finishing lathe comprising a rotary spindle of tubular form, a chuck mounted at one end thereof and formed with air passages opening on its front face and in communication with the interior of the spindle, an air pump, a drive motor operatively connected with the air pump and with the spindle to actuate the two simultaneously, a tubular connection between the air pump and that end of the spindle remote from the chuck, a relief valve in said tubular connection adjacent the pump to maintain a predetermined degree of vacuum in the tubular connection, the spindle and the air passages when a piece of pottery is mounted on the chuck in covering relation to said passages, a normally closed valve included in said tubular connection, a treadle operatively connected with said valve to permit opening of the latter to place the tubular connection in communication with the atmosphere to break the vacuum in the air passages and permit release of the retained piece, the tubular connection adjacent its point of attachment to the spindle being provided with a manually adjustable valve to selectively vary the time element in establishing the desired degree of vacuum following the mounting of the piece of pottery on the chuck.

ARTHUR A. WELLS.